(12) United States Patent
Song et al.

(10) Patent No.: US 12,292,614 B2
(45) Date of Patent: May 6, 2025

(54) LENS MODULE WITH SHORT FOCAL DISTANCE AND ELECTRONIC DEVICE USING THE SAME

(71) Applicant: TRIPLE WIN TECHNOLOGY(SHENZHEN) CO. LTD., Shenzhen (CN)

(72) Inventors: Jian-Chao Song, Guangdong (CN); Jing-Wei Li, Guangdong (CN); Sheng-Jie Ding, Jincheng (CN); Shin-Wen Chen, New Taipei (TW)

(73) Assignee: TRIPLE WIN TECHNOLOGY(SHENZHEN) CO. LTD., Shenzhen (CN)

( * ) Notice: Subject to any disclaimer, the term of this patent is extended or adjusted under 35 U.S.C. 154(b) by 402 days.

(21) Appl. No.: 18/070,324

(22) Filed: Nov. 28, 2022

(65) Prior Publication Data
US 2023/0213725 A1    Jul. 6, 2023

(30) Foreign Application Priority Data
Dec. 31, 2021    (CN) .......................... 202111670173.0

(51) Int. Cl.
G02B 7/02    (2021.01)
G02B 7/00    (2021.01)
G02B 13/06    (2006.01)

(52) U.S. Cl.
CPC ............... *G02B 7/02* (2013.01); *G02B 7/006* (2013.01); *G02B 13/06* (2013.01)

(58) Field of Classification Search
CPC .......... G02B 7/02; G02B 7/006; G02B 13/06; G03B 17/14
See application file for complete search history.

(56) References Cited

U.S. PATENT DOCUMENTS

2018/0035021 A1*    2/2018    Wang ................... H05K 1/0274

FOREIGN PATENT DOCUMENTS

CN    211627907 U    10/2020

\* cited by examiner

*Primary Examiner* — James C. Jones
(74) *Attorney, Agent, or Firm* — ScienBiziP, P.C.

(57) ABSTRACT

A lens module, constructed to include all necessary filters but retaining its wide-angle characteristic and short focal length, is comprised of a housing, a cover plate, and a filter switcher. The housing and the cover plate form a receiving cavity, the cavity containing the filter switcher. The filter switcher includes holder, two mounting frames, two first adhesive layers, and two filters, and is of minimal thickness. The two first adhesive layers fix the filters on the two mounting frames. An enlarged installation space within the lens module is not required. The disclosure also relates to an electronic device using the lens module.

20 Claims, 11 Drawing Sheets

FIG. 11 ns with reference to the attached figures.

LENS MODULE WITH SHORT FOCAL DISTANCE AND ELECTRONIC DEVICE USING THE SAME

FIELD

The subject matter of the application generally relates to a lens module, and more particularly to a lens module with a short focus distance and an electronic device using the lens module.

BACKGROUND

Electronic devices, such as mobile phones, tablet computers, or cameras, may have lens modules. The lens module includes a lens, a holder, a filter-switching mechanism, and a circuit board. The filter-switching mechanism is disposed between the lens and the circuit board. The filter-switching mechanism has a holder and at least two filters mounted on the holder. The filter-switching mechanism can switch to different filters in use. In security and monitoring systems, a lens module must be wide-angle, which requires a small focal length. Thus, a distance between the lens and the circuit board with photosensitive chip is very restricted.

However, each filter may be adhered on the holder through an adhesive layer. If a thickness of the filter-switching mechanism is thick, mounting the filter-switching mechanism in such a small space between the lens and the circuit board will be more difficult. Moreover, the filter can be easily separated from the holder during a switching process, and the physical reliability of current filter-switching mechanism is poor.

Therefore, there is room for improvement in the art.

BRIEF DESCRIPTION OF THE DRAWINGS

Implementations of the present disclosure will now be described, by way of embodiments, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain portions may be exaggerated to better illustrate details and features of the present disclosure.

The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

The term "comprising," when utilized, means "including, but not necessarily limited to"; it specifically indicates open-ended inclusion or membership in the so-described combination, group, series, and the like.

FIGS. 1 to 6 show an embodiment of a lens module 100 according to the present disclosure. The lens module 100 includes a housing 1, a cover plate 8, and a filter switcher 10. The housing 1 and the cover plate 8 cooperatively form a receiving cavity 20. The filter switcher 10 is received in the receiving cavity 20. The filter switcher 10 includes a holder 2, two mounting frames 3, two first adhesive layers 4, and two filters 5. The holder 2 includes a first surface 21, a second surface 22 opposite to the first surface 21. Two windows 23 penetrate through the first surface 21 and the second surface 22. Each mounting frame 3 is disposed on an inner wall of one window 23. The mounting frame 3 includes a connecting portion 31 and a platform portion 32. The connecting portion 31 is connected to the inner wall of the window 23. A portion of a surface of the connecting portion 31 away from the inner wall of the window 23 extends towards a central axis (defined as "a") of the window 23 to form the platform portion 32. In a direction of the central axis "a", a first thickness (defined as "h1") of the platform portion 32 is less than a second thickness (defined as "h2") of the holder 2. The connecting portion 31 and the platform portion 32 cooperatively form a slot 36. One first adhesive layer 4 is formed in one slot 36. Each of the filters 5 is arranged on one first adhesive layer 4, and the two filters 5 are coplanar. The two filters 5 may have different filtering performance and functions.

Figure 1:
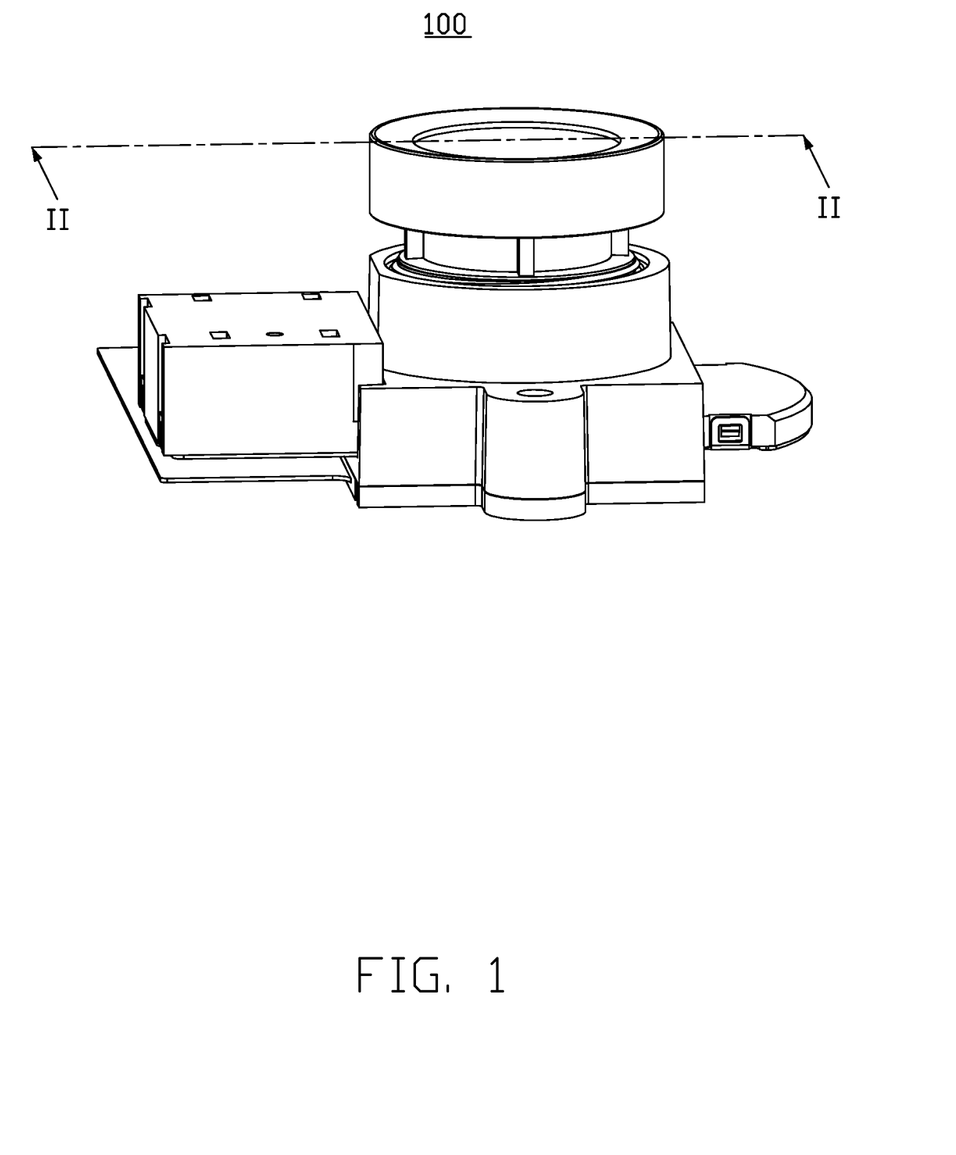
FIG. 1 is a perspective view of an embodiment of a lens module according to the present disclosure.
Figure 2:
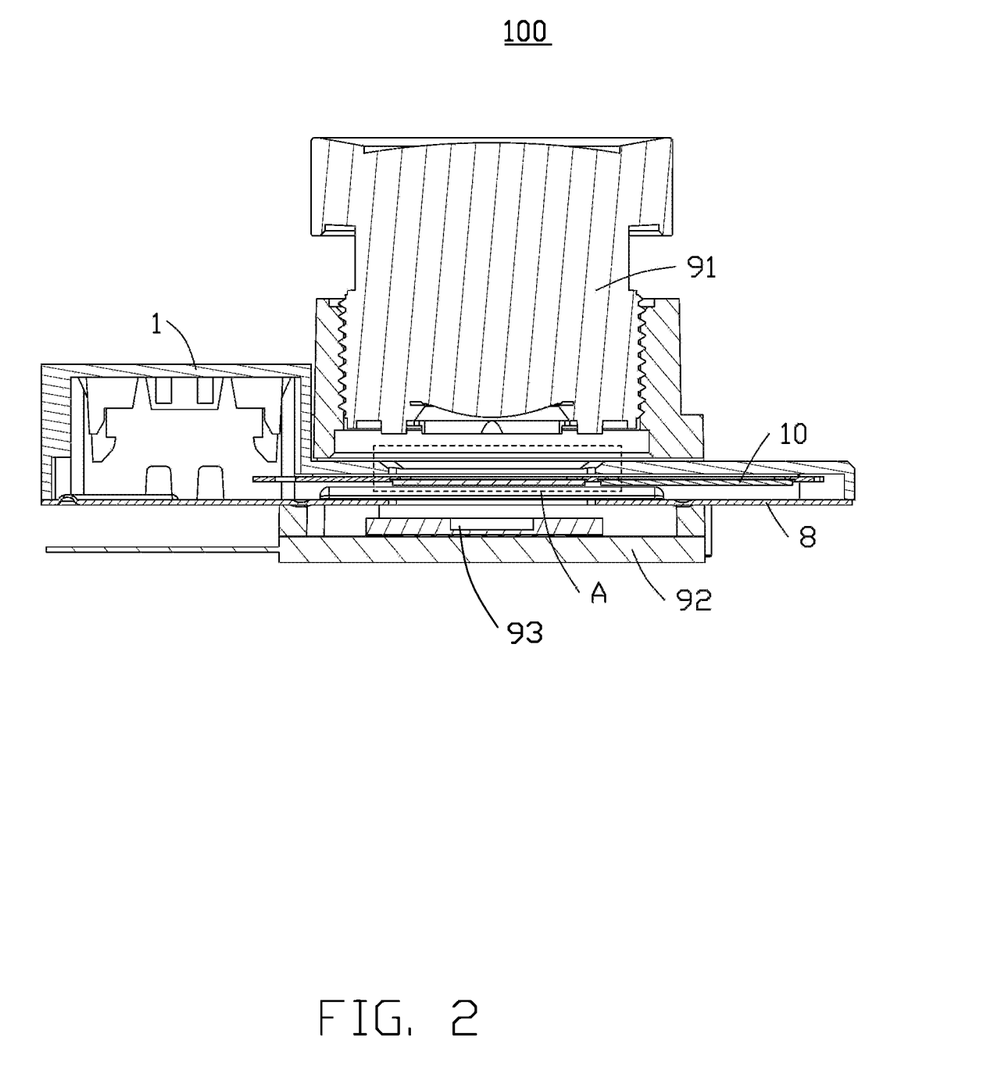
FIG. 2 is a cross-section view along line II-II of FIG. 1.
Figure 3:
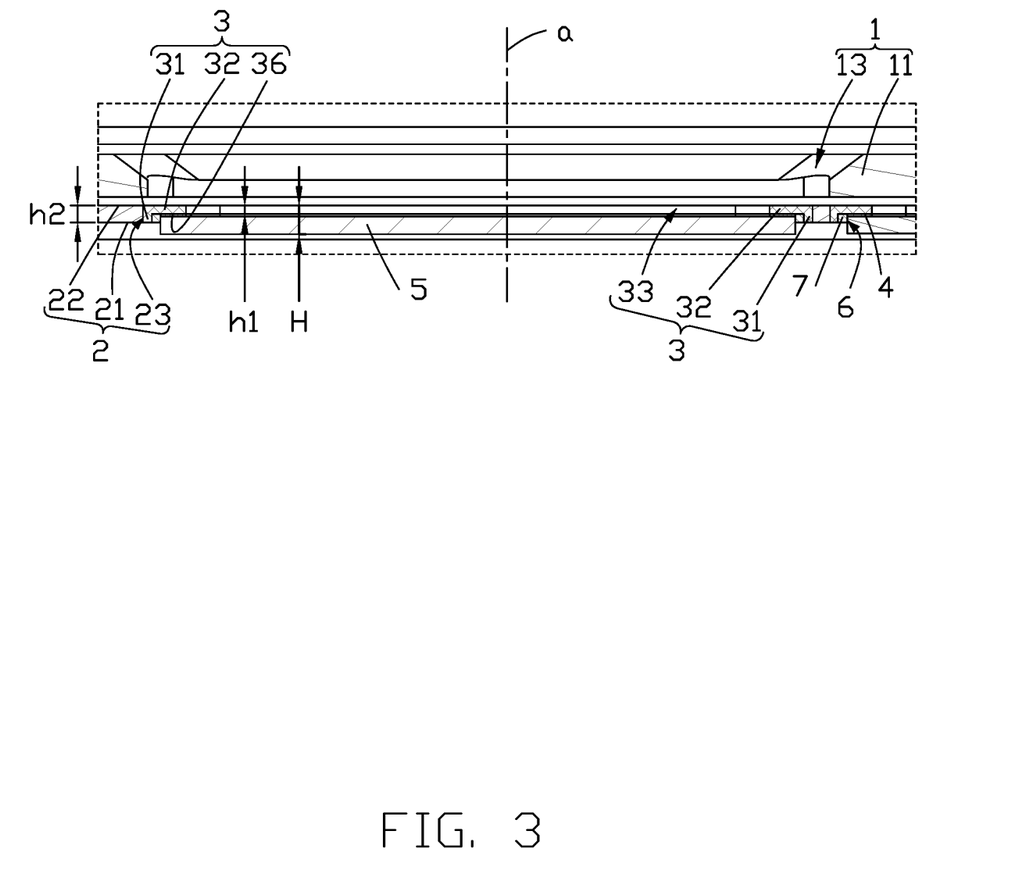
FIG. 3 is an enlarged perspective view of portion A of FIG. 2.
Figure 4:
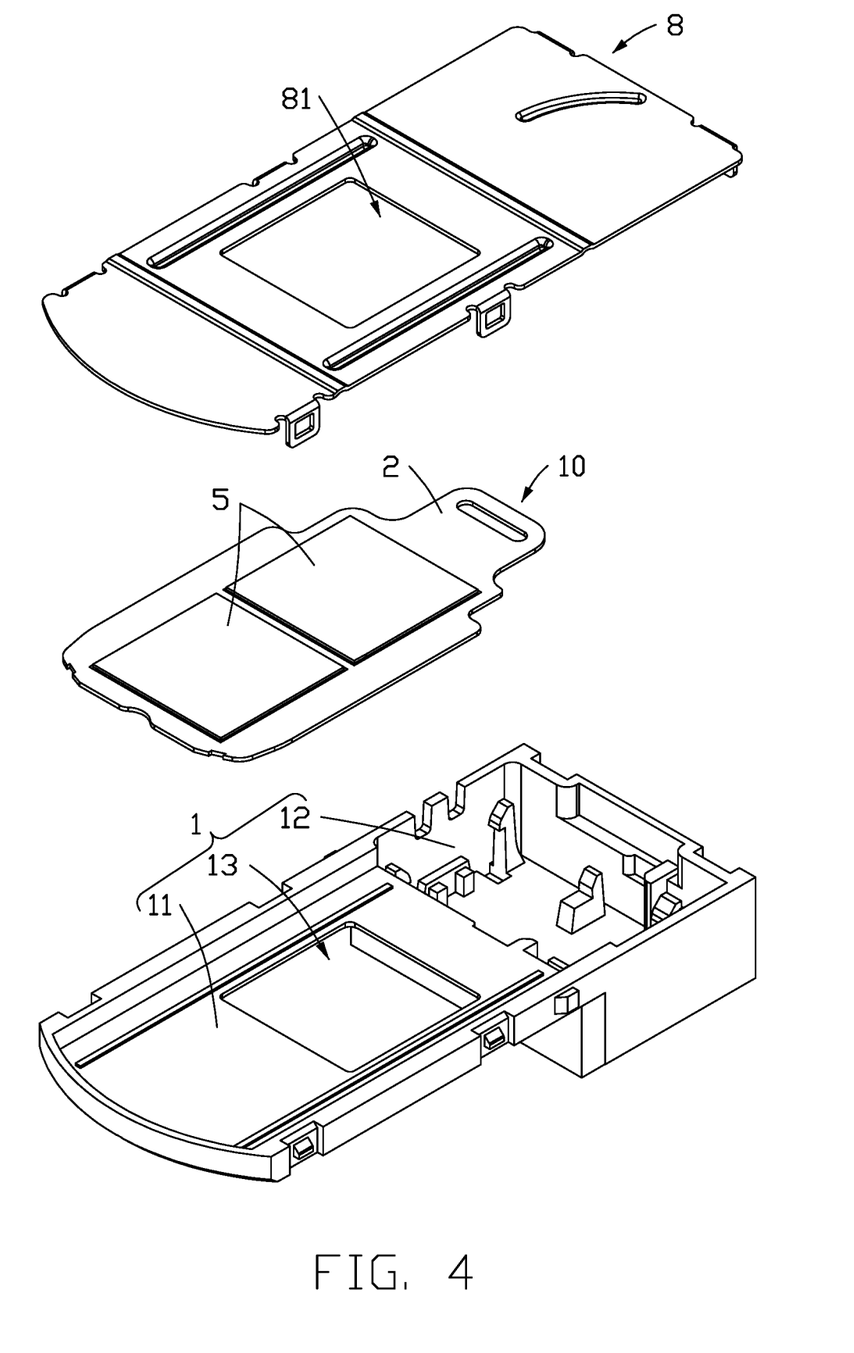
FIG. 4 is an exploded view of a holder, a cover plate, and a filter switcher of the lens module of FIG. 1.
Figure 5:
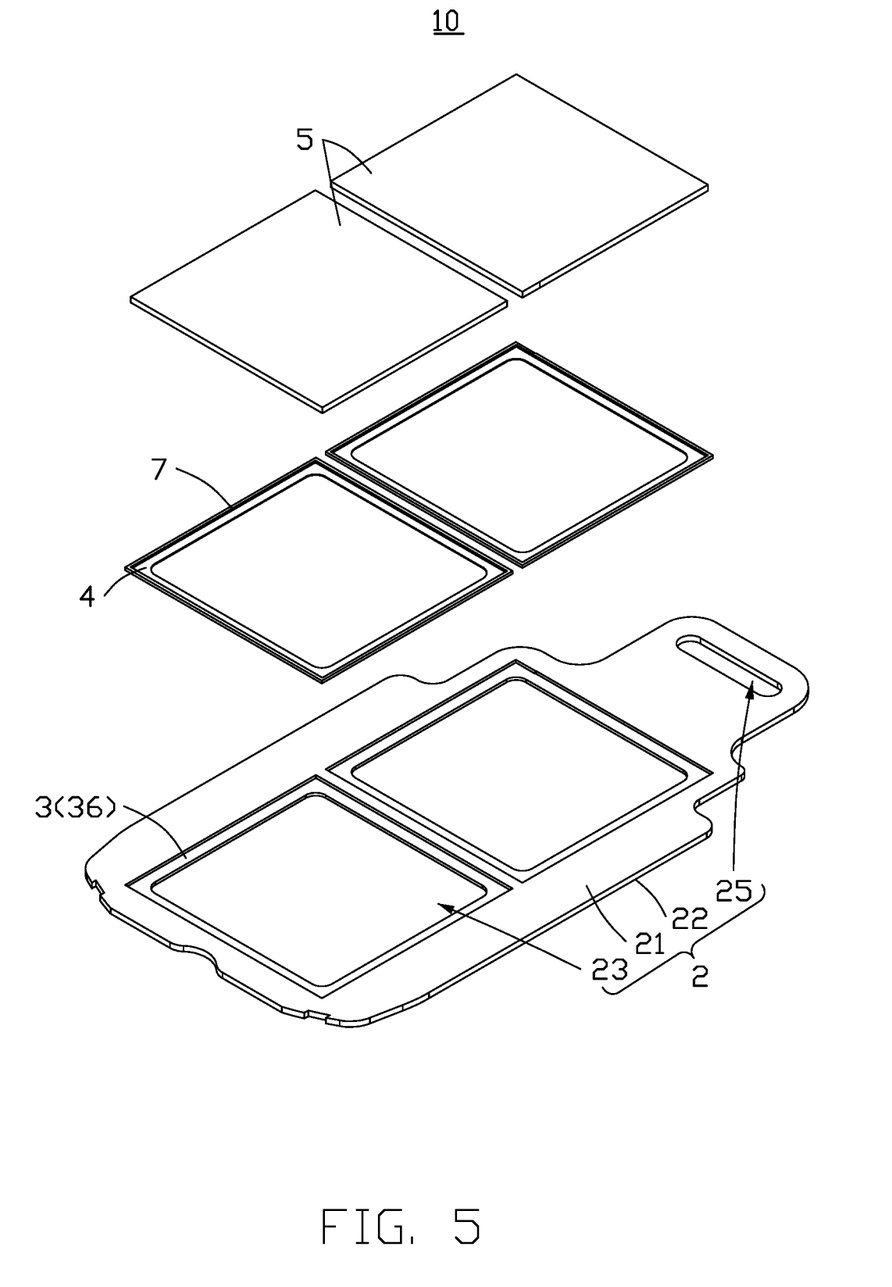
FIG. 5 is an exploded view of the filter switcher of FIG. 4.
Figure 6:
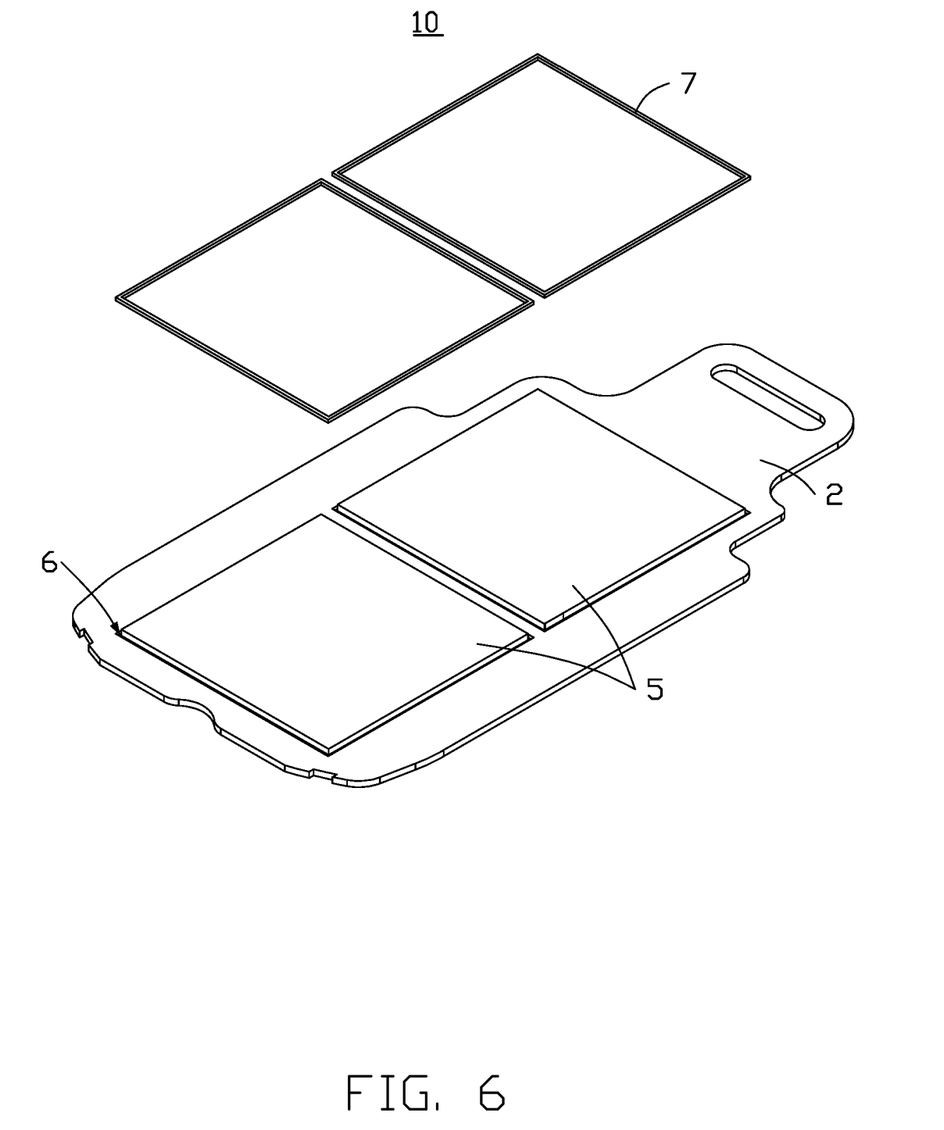
FIG. 6 is a perspective view showing process of assembly of the filter switcher of FIG. 5.
Figure 7:
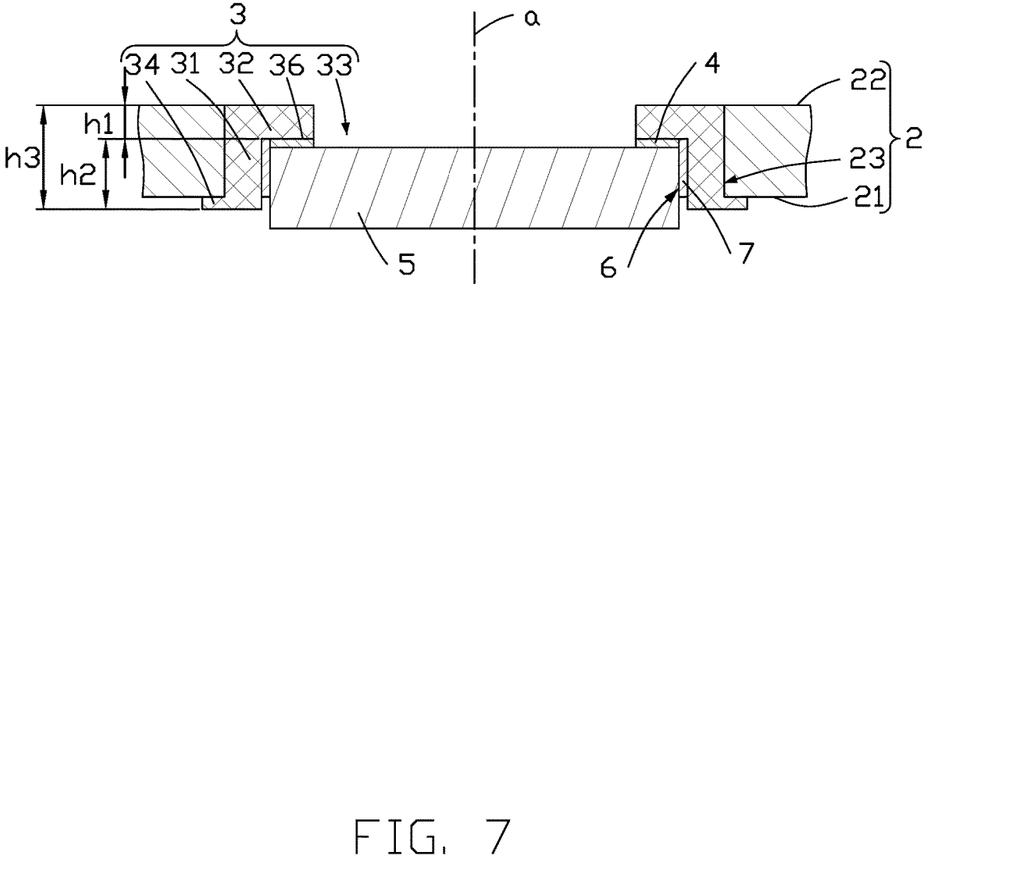
FIG. 7 is a cross-section view of another embodiment of a filter switcher according to the present disclosure.

Referring to FIG. 7, in another embodiment, the mounting frame 3 further includes a first through hole 33. The first through hole 33 is substantially coaxial with the window 23. One filter 5 is exposed from the first through hole 33. In the direction of the central axis "a", a third thickness (defined as "h3") of the connecting portion 31 may be greater than a second thickness "h2" of the holder 2. When the third thickness "h3" is larger than the second thickness "h2", the connecting portion 31 extends to the first surface 21 and/or the second surface 22 to form a cladding layer 34. The cladding layer 34 increases an area of contact between the mounting frame 3 and the holder 2 to improve strength of the bond between mounting frame 3 and holder 2. The cladding layer 34 is itself thin, and a resulting increase in overall thickness of the filter switcher 10 is negligible. In an embodiment, the connecting portion 31 extends to the first surface 21 to form the cladding layer 34. In the direction of the central axis "a", a surface of the cladding layer 34 away from the first surface 21 is not exceed a surface of the filter 5 away from the first surface 21, so the cladding layer 34 on the first surface 21 does not increase the overall thickness of the filter switcher 10.

The mounting frame 3 and the holder 2 may be integrally formed. The holder 2 is made of metal, and the mounting frame 3 is made of plastic. In an embodiment, each mounting frame 3 is formed on the inner wall of the window 23 through a nano-injection molding process. The nano-injection molding process improves the strength of bond between the mounting frame 3 and the holder 2. Thus, the reliability and structural stability of the mounting frame 3 are improved. In addition, the first adhesive layer 4 is directly adhered to the mounting frame 3, so there is greater adhesive strength between the first adhesive layer 4 and the mounting frame 3, and the structural stability of each filter 5 is further improved.

Referring to FIG. 7, a gap 6 is defined between a sidewall of the filter 5 and the connecting portion 31. A second adhesive layer 7 is disposed in the gap 6. By adding the second adhesive layer 7, the structural stability of the filters 5 in the windows 3 can be improved. In addition, the second adhesive layers 7 abuts against the sidewall of the filters 5 to prevent the filters 5 from shifting and being displaced in the mounting frame 3. Thus, the reliability of the filter switcher 10 is improved.

Figure 8:
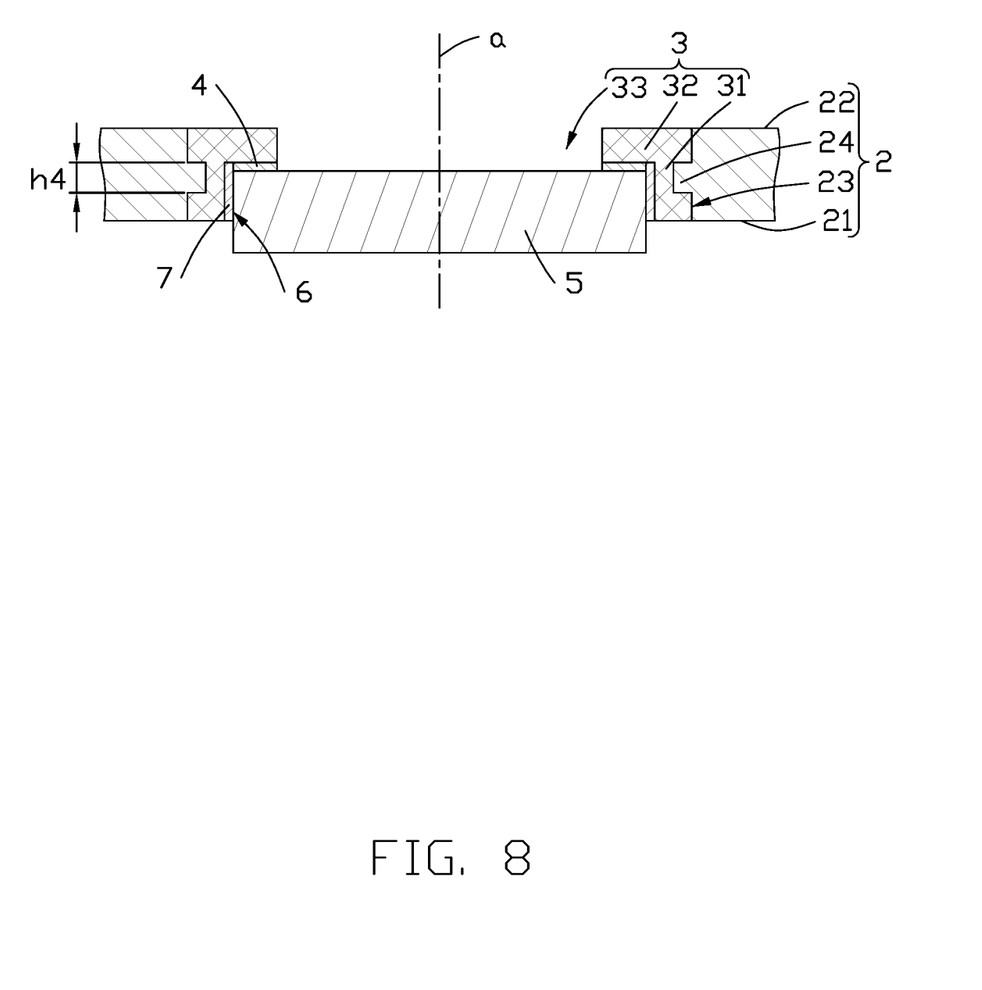
FIG. 8 is a cross-section view of yet another embodiment of a filter switcher according to the present disclosure.

Referring to FIG. 8, in yet another embodiment, at least one bump 24 extends from the inner wall of the window 23. The bump 24 extends into the mounting frame 3. The bump 24 on the inner wall of the window 23 may act as a connecting rib inside the mounting frame 3, which can improve the bond strength between the mounting frame 3 and the holder 2. Thus, there is no separation of the mounting frame 3 from the holder 2, and the reliability of the filter switcher 10 is improved.

In an embodiment, there is a plurality of bumps 24 on the inner wall of the window 23. The bumps 24 are in the connecting portion 31, and do not protrude from a surface of the connecting portion 31 facing the central axis "a", so the installation of the filter 5 is not affected, and the filter 5 is not damaged.

In an embodiment, the bumps 24 are formed when the window 23 is defined, which simplifies a manufacturing process of the holder 2. In the direction of the central axis "a", a fourth thickness (defined as "h4") of the bump 24 is smaller than the second thickness "h2" of the holder 2.

Figure 9:
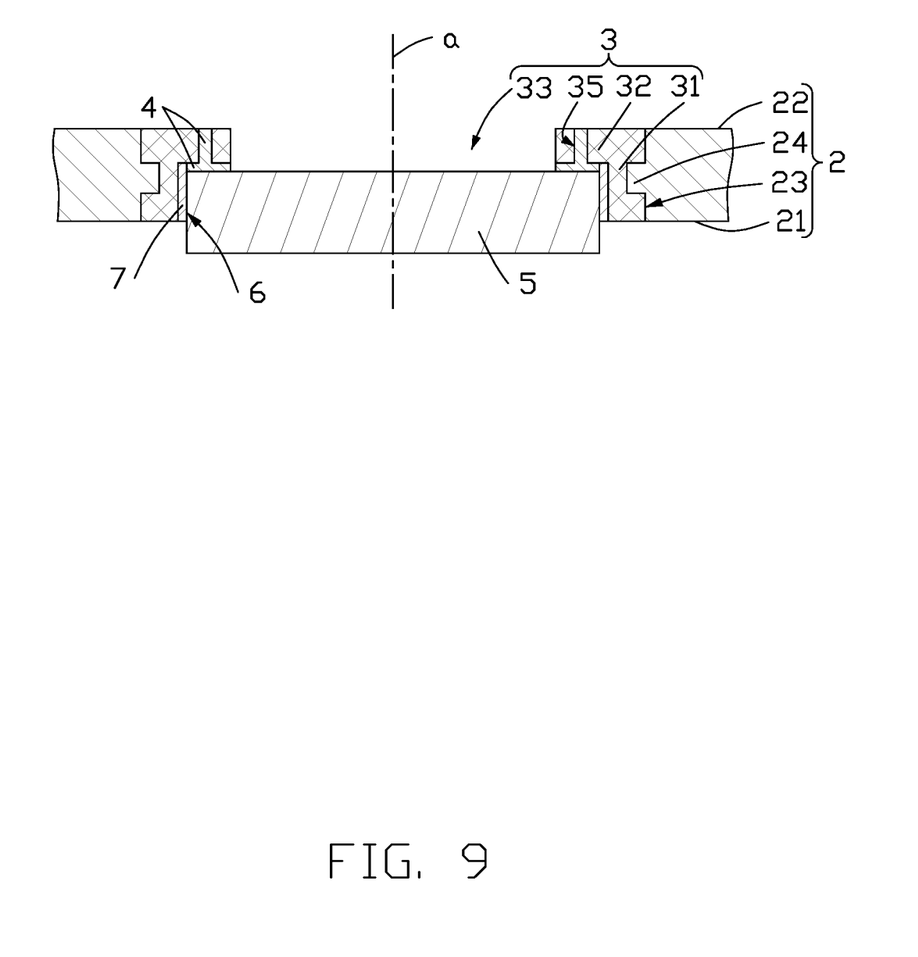
FIG. 9 is a cross-section view of yet another of a filter switcher according to the present disclosure.

Referring to FIG. 9, in yet another embodiment, the platform portion 32 defines a plurality of holes 35. Each hole 35 penetrates through the platform portion 32 along the central axis "a". The first adhesive layer 4 extends into the holes 35. Thus, the bonding strength between the first adhesive layer 4 and the platform portion 32, and thus between the filter 5 and the platform portion 32, are improved. A separation of the filter 5 from the platform portion 32 is avoided, and the reliability of the filter switch 10 is improved.

Referring to FIGS. 2 to 4, and 10, the housing 1 is substantially a hollow rectangular frame. The housing 1 includes a first bearing portion 11 and a second bearing portion 12. The first bearing portion 11 includes a second through hole 13. The filter switcher 10 is arranged on the first bearing portion 11. A moving unit 14 is disposed on the second bearing portion 12. The moving unit 14 is movably connected to the filter switcher 10. The moving unit 14 drives the filter switcher 10 along a direction (defined as "b"), so that one or other of the two filters 5 is exposed at the second through hole 13. The direction "b" is perpendicular to the central axis "a", and the direction "b" is the direction of arrangement of the two filters 5.

Figure 10:
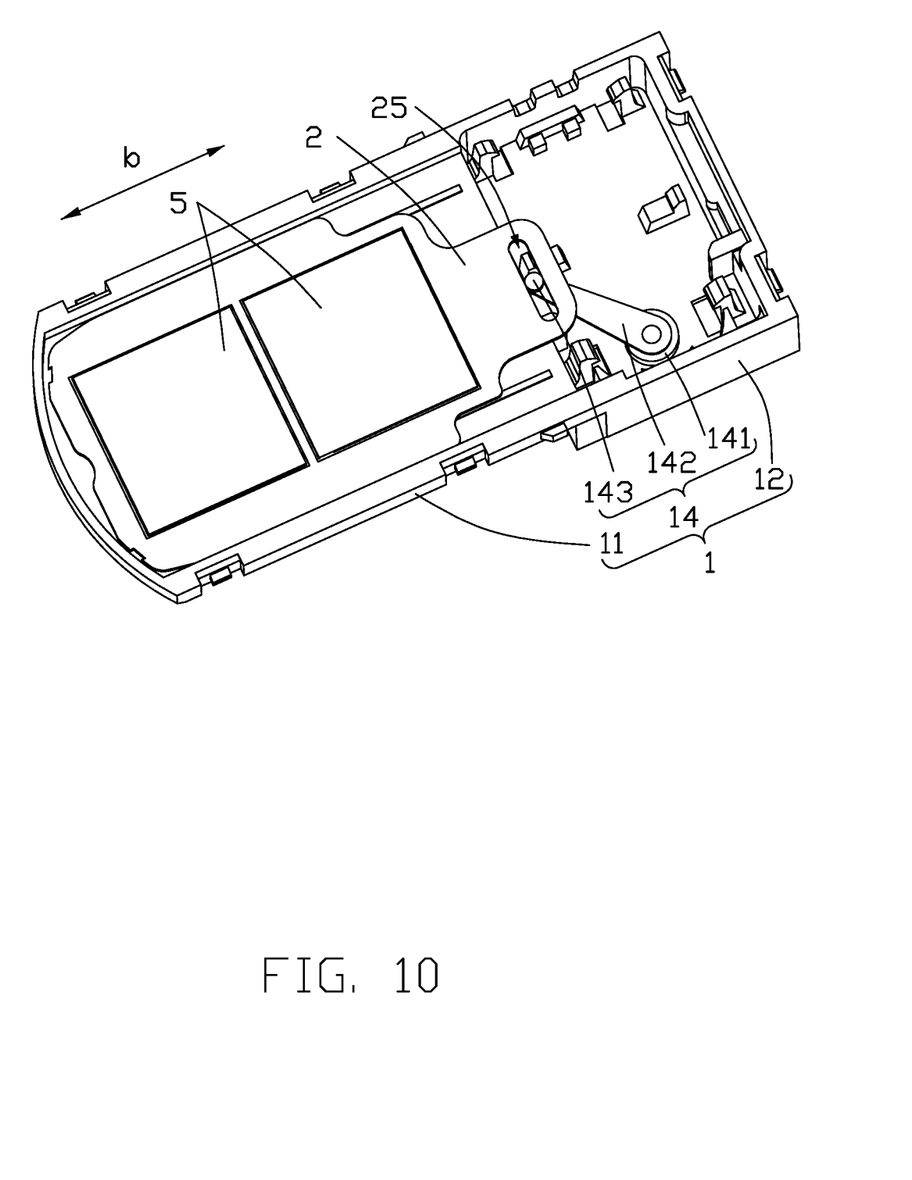
FIG. 10 is a perspective view of the filter switcher and a rotational-movement unit of the lens module of FIG. 1.

In an embodiment, the moving unit 14 includes a rotating mechanism 141 arranged on the second bearing portion 12 and a connecting arm 142 arranged on the rotating mechanism 141. A clamping block 143 is provided on an end of the connecting arm 142 away from the rotating mechanism 141. A through slot (slot 25) is defined at an end of the holder 2 close to the second bearing portion 12. The clamping block 143 extends into the through slot 25. The rotation mechanism 141 rotates the connecting arm 142 to drive the filters 5 back and forth along the direction "b", so that one of the two filters 5 is exposed at the second through hole 13.

Referring to FIGS. 1 to 3, and 6, the lens module 100 further includes a lens 91 disposed on the housing 1 away from the cover plate 8 and a printed circuit board 92 with photosensitive chip 93 disposed on a side of the cover plate 8 away from the housing 1. The filter switcher 10 is disposed between the lens 91 and the printed circuit board 92. The cover plate 8 defines a third through hole 81 substantially coaxial with the second through hole 13 and the lens 91. The lens 91, the second through hole 13, and the third through 81 are substantially coaxial with each first through hole 33, when the filter switcher 10 is driven along the direction "b". The space for installation inside the filter switcher 10 depends on a distance between the lens 91 and the printed circuit board 92. When the lens module 100 has a wide-angle capability with a short focal distance, the installation space of the filter switcher 10 is very small. In an embodiment, referring to FIG. 5, a total thickness (defined as "H") of the filter switcher 10 is equal to a sum of the first thickness "h1" of the platform portion 32, a thickness of the first adhesive layer 4, and a thickness of the filter 5. The first thickness "h1" of the platform portion 32 ranges from 0.06 mm to 0.15 mm, 0.1 mm is preferred for thickness "h1". The thickness of the filter 5 is about 0.21 mm. The thickness of the first adhesive layer 4 is about 0.03 mm. Then the total thickness "H" of the filter switcher 10 is about 0.34 mm. A traditional filter switcher has a thickness about 1 mm, but this disclosure provides a filter switcher 10 with significantly reduced thickness. The filter switcher 10 is very thin, and allows a lens module 100 with wide-angle and short focal distance. The focal distance of the lens module 100 can be adjusted to be smaller.

Figure 11:
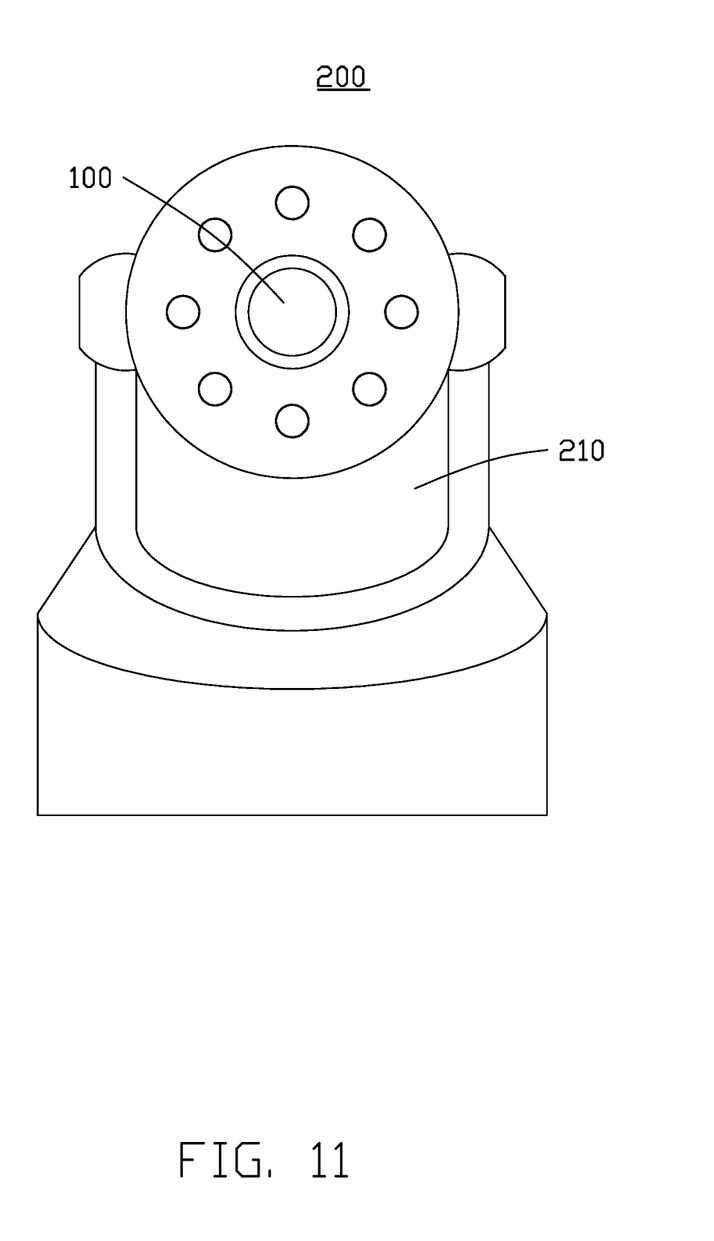
FIG. 11 is a perspective view of an electronic device according to the present disclosure.

FIG. 11 shows an embodiment of an electronic device 200. The electronic device 200 includes a body 210 and the lens module 100 mounted in the body 210. The electronic device 200 may be a monitoring device, a smart phone, a tablet computer, a wearable device, or the like. In at least one embodiment, the electronic device 200 is a monitoring device.

In the lens module 100 of the present disclosure, the mounting frame 3 is arranged in the window 23 of the holder 2. The thickness of the platform portion 32 of the mounting frame 3 is thin. Each filter 5 is fixed on the platform portion 32 through one first adhesive layer 4, which reduces the overall thickness of the filter switch 10. The filter switch 10 is suitable for lens module 100 with wide-angle and short focal distance. Furthermore, the strength of bond between the mounting frame 3 and the holder 2 is enhanced, so there is no separation of the filter 5 from the platform portion 32, thereby the reliability of the lens module 100 is improved.

The embodiments shown and described above are only examples. Many details are often found in the art such as the other features of a lens module and an electronic device using the lens module. Therefore, many such details are neither shown nor described. Even though numerous characteristics and advantages of the present disclosure have been positioned forth in the foregoing description, together with details of the structure and function of the present disclosure, the disclosure is illustrative only, and changes can be made in the detail, including in matters of shape, size, and arrangement of the parts within the principles of the present disclosure, up to and including the full extent established by the broad general meaning of the terms used in the claims. It will therefore be appreciated that the embodiments described above can be modified within the scope of the claims.

What is claimed is:

1. A lens module comprising:
   a housing;
   a cover plate cooperating with the housing to form a receiving cavity; and
   a filter switcher received in the receiving cavity and comprising:
      a holder comprising a first surface, a second surface opposite to the first surface, and two windows penetrating through the first surface and the second surface;
      a mounting frame disposed in each of the two windows, the mounting frame comprising a connecting portion and a platform portion, wherein the connecting portion is connected to an inner wall of a corresponding one of the two windows, the platform portion extends from a portion of a surface of the connecting portion away from the inner wall, a first thickness of the platform portion is less than a second thickness of the holder in a direction of the central axis, the connecting portion and the platform portion cooperatively form a slot;
      a first adhesive layer formed in the slot;
      a filter formed on the first adhesive layer.

2. The lens module of claim 1, wherein a bump extends from the inner wall of each of the two windows, the bump is inserted into the mounting frame of the corresponding window.

3. The lens module of claim 2, wherein the mounting frame is bonded to the corresponding window through a nano injection molding process.

4. The lens module of claim 1, wherein the platform portion defines a plurality of holes, the plurality of holes penetrates through the platform portion in the direction of the central axis, the first adhesive layer extends into the plurality of holes.

5. The lens module of claim 1, wherein a gap is defined between a sidewall of the filter and the connecting portion, a second adhesive layer is disposed in the gap.

6. The lens module of claim 1, wherein along the central axis, the first thickness of the platform portion ranges from 0.06 mm to 0.15 mm.

7. The lens module of claim 1, wherein the connecting portion extends beyond the first surface to form a cladding layer, and in the direction of the central axis, a surface of the cladding layer away form the first surface is not beyond a surface of each of the two filters away from the first surface.

8. The lens module of claim 1, wherein the housing comprises a first bearing portion and a second bearing portion, the filter switcher is disposed on the first bearing portion, a moving unit is disposed on the second bearing portion, the moving unit is movably connected to the filter switcher.

9. The lens module of claim 8, wherein the moving unit comprises a rotating mechanism disposed on the second bearing portion and a connecting arm disposed on the rotating mechanism, a clamping block is provided on an end of the connecting arm away from the rotating mechanism, a through slot is defined at an end of the holder close to the second bearing portion, the clamping block extends into the through slot.

10. The lens module of claim 1, further comprising a lens disposed on the housing away from the cover plate; and a printed circuit board disposed on a side of the cover plate away from the housing, the filter switcher being disposed between the lens and the printed circuit board.

11. An electronic device, comprising:
    a body;
    a lens module mounted in the body and comprising:
       a housing;
       a cover plate cooperating with the housing to form a receiving cavity; and
       a filter switcher received in the receiving cavity and comprising:
          a holder comprising a first surface, a second surface opposite to the first surface, and two windows penetrating through the first surface and the second surface;
          a mounting frame disposed in each of the two windows the mounting frame comprising a connecting portion and a platform portion, wherein the connecting portion is connected to an inner wall of a corresponding one of the two windows, the platform portion extends from a portion of a surface of the connecting portion away from the inner wall, a first thickness the platform portion is less than a second thickness of the holder in a direction of the central axis, the connecting portion and the platform portion cooperatively form a slot;
          a first adhesive layer formed in the slot;
          a filter formed on the first adhesive layer.

12. The electronic device of claim 11, wherein a bump extends from the inner wall of each of the two windows, the bump is inserted into the mounting frame of the corresponding window.

13. The electronic device of claim 12, wherein the mounting frame is bonded to the corresponding window through a nano injection molding process.

14. The electronic device of claim 11, wherein the platform portion defines a plurality of holes, the plurality of holes penetrates through the platform portion in the direction of the central axis, the first adhesive layer extends into the plurality of holes.

15. The electronic device of claim 11, wherein a gap is defined between a side wall of the filter and the connecting portion, a second adhesive layer is disposed in the gap.

16. The electronic device of claim 11, wherein along the central axis, the first thickness of the platform portion ranges from 0.06 mm to 0.15 mm.

17. The electronic device of claim 11, wherein the connecting portion extends beyond the first surface to form a cladding layer, and in the direction of the central axis, a surface of the cladding layer away form the first surface is not beyond a surface of each of the two filters away from the first surface.

18. The electronic device of claim 11, wherein the housing comprises a first bearing portion and a second bearing portion, the filter switcher is disposed on the first bearing portion, a moving unit is disposed on the second bearing portion, the moving unit is movably connected to the filter switcher.

19. The electronic device of claim 18, wherein the moving unit comprises a rotating mechanism disposed on the second bearing portion and a connecting arm disposed on the rotating mechanism, a clamping block is provided on an end of the connecting arm away from the rotating mechanism, a through slot is defined at an end of the holder close to the second bearing portion, the clamping block extends into the through slot.

20. The electronic device of claim 10, further comprising a lens disposed on the housing away from the cover plate and a printed circuit board disposed on a side of the cover plate away from the housing, the filter switcher being disposed between the lens and the printed circuit board.

\* \* \* \* \*